Patented Mar. 9, 1943

2,313,589

UNITED STATES PATENT OFFICE 2,313,589

PARASITICIDE COMPOSITION AND METHOD OF PRODUCING THE SAME

Frank J. Seibert and Louis C. Roller, Bound Brook, N. J., assignors to Chipman Chemical Company, Inc., Bound Brook, N. J., a corporation of New York No Drawing. Application April 14, 1941, Serial No. 388,497

8 Claims. (Cl. 167—14)

This invention relates to a parasiticidal composition and method of producing the same and more particularly to a parasiticide containing as the active ingredient a heavy metal, such as copper, and arsenic in the pentavalent form, precipitated with an inert diluent to form a homogeneous unitized composition.

In accordance with the invention, the new parasiticide comprises the reaction product of a soluble sulfate of a heavy metal, an oxide or oxy acid of pentavalent arsenic, and an oxide or hydroxide of an alkaline earth metal, the sulfate of which is insoluble, reacted in such proportions as to produce essentially a heavy metal salt of an oxy acid of pentavalent arsenic and an alkaline earth sulfate, both co-precipitated as a single entity to form a homogeneous composition the ingredients of which do not exist as recognizable separate phases. In the preferred embodiment of the invention, the sulfate of the heavy metal is copper sulfate, and the alkaline earth compound is lime, since these materials are economical and readily available, and the resulting product possesses a good parasiticidal action. In the further description of the invention, copper will be referred to as illustrative of the heavy metals and calcium as illustrative of the alkaline earths, but only for convenience and as the equivalent of the heavy and alkaline earth metals mentioned generically and hereinafter enumerated more specifically. The arsenic may be utilized in any pentavalent form, but for commercial purposes pentavalent arsenic oxide and arsenic acid are of significance.

Copper compounds of pentavalent arsenic, such as copper arsenate or basic tricupric arsenate, have been known, but compounds of this form have not had any marked acceptance as parasiticides.

The failure of the copper arsenates to find acceptance as such or in the forms available for use in the parasiticidal field is probably due at least in part to expensive methods of manufacture and the form in which the copper-arsenic compound exists. This is explained by the fact that the known commercial methods of preparation consist in precipitating the copper arsenate from solutions of soluble copper salts by the addition of a solution of sodium arsenate, the latter resulting from the neutralization of arsenic acid with either soda ash or caustic soda. The sodium salts resulting from the reaction with the copper salts can not be recovered economically and in addition must be removed from the copper arsenate as their presence may cause injury to the foliage; they are also undesirable as an ingredient of the parasiticide because of their effect upon the physical character of the composition. Other methods of preparation involve similar losses of sodium salts either directly or indirectly, or require expensive raw materials, apparatus and treatment.

In accordance with another prior art proposal, it has been suggested that copper oxide be reacted with arsenic acid, but this requires an expensive unignited oxide for optimum results.

It has also been proposed to mix calcium oxide, arsenic acid and hydrated copper sulfate, but with such proportions of water that all of the added water, plus water from the copper sulfate crystals, is absorbed in hydrating the calcium oxide, and the mixture is pulverant throughout the entire reaction. The final product, therefore, does not contain a copper arsenate but contains a calcium arsenate, hydrated lime and dehydrated copper sulfate.

It has not been proposed in the prior art, as far as we are aware, to prepare a parasiticide in which the copper compound is essentially a copper arsenate by a method in which the pentavalent arsenic is combined with the copper and in which lime is used to replace soda ash or caustic soda and calcium remains in the final product as a sulfate which functions as a diluent in intimate combination with the copper arsenate.

It is an object of this invention, therefore, to provide a new parasiticidal composition containing copper combined with pentavalent arsenic which has improved parasiticidal properties and a minimum harmful action to plant life.

An object of the invention is to provide a parasiticidal composition containing copper and pentavalent arsenic combined chemically in a compound that is formed integrally with and in homogeneous and intimate association with an inert diluent.

It is a further object of the invention to provide a simple and economic method of producing the same.

Still a further object of the invention is to provide a method of producing a parasiticidal composition containing copper and pentavalent arsenic chemically combined in compounds which are co-precipitated homogeneously with and upon an alkaline earth sulfate diluent to provide directly a homogeneous and unitized product.

An additional object of the invention is to provide a method in which lime, either anhydrous or hydrated, may be substituted for at least a part of the soda heretofore utilized, and retained in the composition to form a final calcium compound which is a desirable ingredient of the final composition, thus accomplishing a substantial saving in the cost of alkali and reducing or eliminating the necessity for removing alkali salts.

Other objects of the invention will become apparent to those skilled in the art from the following description.

Before proceeding with a more detailed description of the method by which the new parasiticide is formed, it is well to consider the chemistry involved and the probable reactions of the ingredients.

The theoretical reactions representing the combination of copper sulfate, hydrated lime and arsenic acid would be as follows:

$$3CuSO_4.5H_2O + 2H_3AsO_4.\tfrac{1}{2}H_2O$$
or (I)
$$As_2O_5.4H_2O + 3Ca(OH)_2 =$$
$$Cu_3(AsO_4)_2 + 3CaSO_4.2H_2O + 16H_2O$$
or
$$4CuSO_4.5H_2O + 2H_3AsO_4.\tfrac{1}{2}H_2O$$
or (II)
$$As_2O_5.4H_2O + 4Ca(OH)_2 =$$
$$Cu_3(AsO_4)_2.Cu(OH)_2 + 4CaSO_4.2H_2O + 19H_2O$$

From the above reactions it will be seen that either the tricupric arsenate or basic tricupric arsenate may be formed or a mixture of the two compounds may be formed, depending upon the amount of copper sulfate and lime employed. In general, the basic compound, in the case of copper, is more readily obtained since it is the type compound which results when the acid ingredients and alkaline ingredients are approximately neutralized. In commercial practice, also, a slight excess of lime facilitates the reaction, and this tends to stabilize the basic compound phase.

In the above reactions, it will be noted that the arsenic acid has been referred to as $H_3AsO_4$ but the salts of other forms of arsenic acid are to be included, i. e., $H_4As_2O_7$ and $HAsO_3$, which can be regarded merely as forms of arsenic pentoxide combined with different amounts of water.

It will be apparent that these reactions form a compound in which the pentavalent arsenic is combined with the copper to form a compound that is co-precipitated with the calcium as sulfate, these two being the essential ingredients formed.

It has been found that hypothetical reactions of the type proposed above, or combinations thereof may be made to proceed, resulting essentially in the formation of a compound of copper with pentavalent arsenic homogeneously co-precipitated with or upon crystalline calcium sulfate. The resulting products are very fine powders, green to bluish green in color and in which the several ingredients, if not in fact chemically combined are so closely associated physically as to appear and act as a single entity. The new products are relatively low in water soluble arsenic and have the correct physical characteristics for a parasiticidal composition.

The final composition may contain a relatively small amount of calcium arsenate but this will be inconsequential since substantially all of the arsenic is combined in the copper compound. The final product may also contain a relatively small amount of free hydrated lime since as explained, it is desirable under many circumstances to have a slight excess of lime in order that the reaction may be expedited and for practical purposes it is not essential to remove such a slight excess of lime from the final product after the reaction is complete. If desired, an additional amount of lime and arsenic acid may be added in the correct proportions so as to react to form lime arsenate. This, however, may be regarded as a side reaction that does not interfere or modify the principal reaction described above.

The following examples are given as illustrative of the invention, but it is to be understood that the invention is in no way limited thereby or thereto, since it will be obvious to those skilled in this art that many variations may enter into the process and product. For example, the actual quantities of the materials used, i. e., a slight excess of any of the ingredients, particularly if enough lime is used to cause free lime to be present in the final product; the degree, extent and application-point of heating; the quantity of water used; the rates of addition and extent of agitation; length of time the ingredients are permitted to react; the method of drying, etc.; all will produce small variations in the color, physical characteristics and analysis of the product. All such variations may be practiced without departing from the invention as described heretofore and illustrated in the following examples:

*Example I*

Arsenic acid having an arsenic content of about 81.86% and in an amount of 17.34 grams is diluted with 100 cc. of water and added to 50.45 grams of 99% hydrated copper sulfate crystals dissolved in 200 cc. of boiling water. This heated mixture is added in a slow stream with constant agitation to 15.12 grams of commercial (high-calcium) hydrated lime suspended in 200 cc. of cold water. The mixture is then heated to about 135° F. and hydrated lime is added in small portions until the supernatant liquor shows a permanent alkalinity, a total of about 3.3 grams being required. The mixture is then heated to about 206° F., following which it may then be evaporated to dryness at about 180° F.

An analysis of the product shows it to contain basic tricupric arsenate, 40.50% to 41.50%; tricupric-arsenate 2% to 4% and hydrated calcium sulfate, $CaSO_4.2H_2O$, 50% to 52%. The balance of the composition comprises a small amount of hydrated lime, other calcium and/or arsenic compounds, water, impurities and inert materials.

*Example II*

Seven pounds of commercial (high-calcium) hydrated lime is suspended in 20 gallons of cold water in a steam jacketed tank equipped with an agitator. Six and one-half pounds of 81.25% arsenic acid is diluted with four times its volume of cold water and added to the lime slurry with agitation. Eighteen and one-half pounds of 99% hydrated copper sulfate crystals is dissolved in 6 gallons of water at 190° F. and this solution is added to the lime-arsenic acid slurry as fast as the agitation disperses it. Agitation is continued for about one hour at which point the slurry is found to have a pH value of 7.8 at 75° F. The mixture may then be heated to 210° F. for one hour, the only apparent change being a slight increase in the pH value. The entire slurry may then be run into flat pans and evaporated completely to dryness following which the drying may be continued for about 48 hours at about 220° F.

Analysis of the product showed it to contain about 43 to 44% basic tricupric arsenate, 1 to 2% tricupric arsenate, and 45 to 47% calcium sulfate, as $CaSO_4.\tfrac{1}{2}H_2O$. The balance of the composition comprises a small amount of hydrated lime, other calcium and/or arsenic compounds, water, impurities and inert materials.

In the above examples, the order in which the ingredients are added is not controlling and the copper sulfate and the lime may first be reacted following which the arsenic acid may be added.

In carrying out the processes described heretofore, it is desirable that the ingredients should remain in admixture for sufficient time to permit the reaction to go substantially to completion, since such reaction is not instantaneous under all conditions. An elevated temperature is not essential, but in commercial practice, however, in order that the reaction may be concluded as soon as possible, it is desirable to employ elevated temperatures.

It is important that sufficient water be present in admixture with the several ingredients in order to permit them to form a slurry. Since the water is later evaporated an excess is not required, but sufficient amount is necessary to permit the reaction to proceed.

The lower drying temperature given in Example I is selected in order that the calcium sulfate may be dried without loss of its water of crystallization. But it may be dried at higher temperatures as in Example II, if this feature is not regarded as important. In fact, the copper and arsenic content of the final product may be increased to a limited extent, if desired, by increasing the temperature and/or time of drying whereby all or part of the water of crystallization of the fully hydrated calcium sulfate is eliminated. In Example I, which contains hydrated calcium sulfate in an amount from 50 to 52%, about 11% is combined water of crystallization. If this is eliminated, the copper and arsenic content of the total mixture can be increased from the range of 40 to 42% to about 45 to 47%.

The purity or concentration of the raw materials is not of significance, the materials mentioned in the examples merely being those which are readily available for practicing the invention.

It will be noted in accordance with all of the examples that the compound produced is the basic tricupric arsenate such as disclosed heretofore in Reaction II. As has been explained previously when all of the acid ingredients have been reacted with the alkaline ingredients, the basic salt is formed, in the case of copper. This is not necessarily true in the case of other metals. If desired, however, the amount of lime and metal may be decreased, and the compound of the type described in the Equation I will be formed. It will be readily apparent that by proportionately increasing and decreasing the amounts of lime and metallic sulfate with respect to the arsenic acid, the neutral or basic salt may be formed or a mixture of them.

When the reaction is terminated on the alkaline side there will be a small amount of unreacted lime which remains in the composition. This ingredient, and to a lesser extent, the calcium sulfate, have a limited but appreciable solubility in water, and the copper arsenate content of the composition may be increased by washing out any desired quantity of these two calcium compounds. For example, by repeated washing, it is possible to remove any free lime and any portion of the calcium sulfate. This can still be reduced further by removing the water of crystallization from any calcium sulfate remaining.

The content of copper and arsenic may also be increased, while practicing essentially the same process, by substituting an alkali metal alkaline compound, such as soda ash or caustic soda, for a part of the lime. The quantity of the calcium sulfate precipitated may thus be reduced by the amount that is replaced by soda. For example, if one-half of the lime is replaced by soda the diluent content will be reduced one-half but the manufacturing economy will be lost to a corresponding extent. The amount of lime replaced by soda should not be so large but that the final product contains a substantial portion of calcium sulfate diluent, whereby the advantages of the diluent in the final product and the economic advantages in manufacture are both retained. The sodium sulfate resulting is more readily removed by washing than the less-soluble calcium sulfate, and the proportion of the copper arsenate to calcium sulfate may thus be increased.

In the description of the invention heretofore, it is stated that any heavy metal or metals (other than copper) whose sulfate is soluble may be used to replace a part or all of the copper. The most important of these metals are aluminum, iron, magnesium, manganese, zinc and nickel. Others, currently more expensive, are cadmium, chromium, cobalt and tin.

In place of a part or all of the lime, the oxide or hydroxide of any metal may be used which forms any insoluble sulfate. Examples are barium and strontium oxides and hydroxides.

In addition to the advantages already pointed out, the invention possesses the advantage that the co-precipitation of the active parasiticide component of the composition with and upon the inert diluent eliminates any necessity later for mixing the active ingredient with an inert ingredient, which is now more or less the practice with most parasiticides used on various crops and plants. The invention also results in lower cost, and in a more uniform material in which all of the particles are identical in composition, as compared with the product resulting from the dry mixing of the active parasiticide ingredient with an inert diluent which produces a mixture some particles of which are of high toxic value and potentially injurious to the plant, and other particles are of no effect whatever.

In addition, the different arsenates formed in accordance with the process and particularly the arsenates of different metals when more than one heavy metal is used, each of which have variable physical and parasiticidal characteristics, are co-precipitated in the manner disclosed to form a product each particle of which has the average of these characteristics so that the product is essentially one in which all of the particles have a similar property. These advantages are believed to result in a reduction of the total amount of arsenic required for a given condition and to provide an acceptable substitute for lead compounds whereby the known hazards of cumulative lead poisoning in the system will be eliminated.

A product comprising copper arsenite may be prepared by a somewhat similar process by using a trivalent arsenic-containing acid, as is described in our application Serial No. 388,496, filed of even date herewith.

As has been described heretofore, the invention includes many variations in the materials used, reaction conditions and other factors, all of which are to be included as expressed in the following claims.

We claim:

1. A parasiticidal composition comprising an arsenate of a metal the sulfate of which is relatively water-soluble and the arsenate of which is water-insoluble, and a sulfate of an alkaline earth metal, the sulfate of which is insoluble, both co-precipitated as a composition of homogeneous and uniform particles.

2. A parasiticidal composition of matter comprising a copper arsenate and calcium sulfate, both co-precipitated as a composition of homogeneous and uniform particles.

3. A parasiticidal composition of matter comprising basic tricupric arsenate and calcium sulfate, both co-precipitated as a compound of homogeneous and uniform particles.

4. A parasiticidal composition of matter comprising a copper arsenate and hydrated calcium sulfate, both co-precipitated as a composition of homogeneous and uniform particles.

5. A method of producing a parasiticidal composition of matter which comprises reacting a sulfate of a metal the sulfate of which is relatively water-soluble and the arsenate of which is water-insoluble, an alkaline earth hydroxide, the sulfate of which alkaline earth is relatively insoluble, and a pentavalent arsenic compound selected from the group consisting of arsenic oxide and acids, in an amount of water to form a slurry and in such proportions that the acid and alkaline constituents are substantially neutralized and substantially all of said metal is combined with the arsenic acid and co-precipitated from said slurry with the sulfate of the alkaline earth to form a composition the particles of which are uniform and homogeneous.

6. A method of producing a parasiticidal composition of matter which comprises reacting copper sulfate, lime, and a pentavalent arsenic compound selected from the group consisting of arsenic oxide and acids, in an amount of water to form a slurry and in such proportions that the acid and alkaline constituents are substantially neutralized and substantially all of the copper is combined with the arsenic compound, whereby a copper arsenate is co-precipitated from said slurry with the calcium sulfate to form a composition the particles of which are uniform and homogeneous.

7. A process of producing a parasiticide which comprises the direct approximate neutralization of copper sulfate and arsenic acid in the same water medium with hydrated lime.

8. The method set forth in claim 7 in which the proportions are such as to produce basic tricupric arsenate as the copper-arsenic salt.

FRANK J. SEIBERT.
LOUIS C. ROLLER.